(12) United States Patent
Lu et al.

(10) Patent No.: US 12,026,561 B2
(45) Date of Patent: Jul. 2, 2024

(54) DYNAMIC AUTHENTICATION AND AUTHORIZATION OF A CONTAINERIZED PROCESS

(71) Applicant: Cisco Technology, Inc., San Jose, CA (US)

(72) Inventors: Xiaochun Lu, San Jose, CA (US); Yiwen Zhang, San Jose, CA (US); Alphonse Hansel Anthony Selvanayagam, Milpitas, CA (US); Ajeet Pal Singh Gill, Fremont, CA (US); Ravinandan Govinda Rao Arakali, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 17/004,203

(22) Filed: Aug. 27, 2020

(65) Prior Publication Data
US 2022/0066845 A1   Mar. 3, 2022

(51) Int. Cl.
| | | |
|---|---|---|
| *G06F 9/54* | (2006.01) | |
| *G06F 9/48* | (2006.01) | |
| *H04L 9/08* | (2006.01) | |
| *H04L 9/32* | (2006.01) | |

(52) U.S. Cl.
CPC .............. *G06F 9/545* (2013.01); *G06F 9/485* (2013.01); *H04L 9/0825* (2013.01); *H04L 9/3236* (2013.01); *H04L 9/3247* (2013.01)

(58) Field of Classification Search
CPC ........ G06F 9/545; G06F 9/484; H04L 9/0825; H04L 9/3236; H04L 9/3247
See application file for complete search history.

(56) References Cited

U.S. PATENT DOCUMENTS

| | | | |
|---|---|---|---|
| 8,959,595 | B2 | 2/2015 | Wang et al. |
| 10,097,353 | B1 | 10/2018 | Carlson |
| 10,298,577 | B1 | 5/2019 | Aithal et al. |
| 11,088,842 | B1* | 8/2021 | Floyd ................... H04L 9/3239 |
| 2016/0283737 | A1* | 9/2016 | Soman ................ G06F 21/6245 |
| 2017/0329588 | A1* | 11/2017 | Lundberg ........... G06F 9/44521 |
| 2017/0344407 | A1* | 11/2017 | Jeon ........................ G06F 21/74 |
| 2020/0021615 | A1 | 1/2020 | Wainner et al. |

FOREIGN PATENT DOCUMENTS

WO    2019184164 A1    3/2019

* cited by examiner

*Primary Examiner* — Wissam Rashid
(74) *Attorney, Agent, or Firm* — Polsinelli P.C.

(57) ABSTRACT

The present technology addresses a need in the art for an automated and scalable mechanism to authorize a containerized process. An aspect of the present technology deals with authorizing an unprivileged process by a privileged process without embedding credentials or network access at the time of validation. The present technology provides the possibility for the privileged process to continuously (dynamically) validate the authenticity of the unprivileged process by performing a plurality of operations to ensure the unprivileged process has maintained its authenticity while having access to sensitive information.

15 Claims, 6 Drawing Sheets

DYNAMIC AUTHENTICATION AND AUTHORIZATION OF A CONTAINERIZED PROCESS

TECHNICAL FIELD

The present technology pertains to authorizing a process by a privileged process and, more particularly, to dynamically authorizing the process by comparing a hash value appended to a binary code prior to and throughout the execution of the process.

BACKGROUND

It is important to have mechanisms to verify that software to be installed or executed on a computing system is safe and authentic. One mechanism that is sometimes used is for a trusted source to sign the code of an application or process. The trusted source can either be the author of the code or an entity that tests and inspects code. Then, an entity desiring to run the code can verify the authenticity of the software by verifying that the digital signature associated with the software is the proper digital signature for the trusted source. However, there are at least two drawbacks associated with this verification approach. First, static content on the filesystem can be modified after the validation of the digital signature, which circumvents the digital signature approach. Second, library calls can be hijacked at runtime after the verification, thereby making verification using the digital signature an ineffectual approach.

A further method of determining that software is safe and authentic involves identifying some safe code blocks in the software with a hash value. Then, when the software is to be executed, a service, such as might be provided by an operating system, can validate the code blocks by computing a hash value and comparing it to a list of expected hash values. If a hash for a code block does not match with a pre-determined value, the service realizes that the integrity of the code block has been lost due to some malicious behaviors. After realizing that the integrity of the code block has been lost, the service aborts access of the code block to sensitive information. Despite these attempts at authenticating and verifying the integrity of software code, the methods continue to have disadvantages.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION OF EXAMPLE EMBODIMENTS

Figure 1:
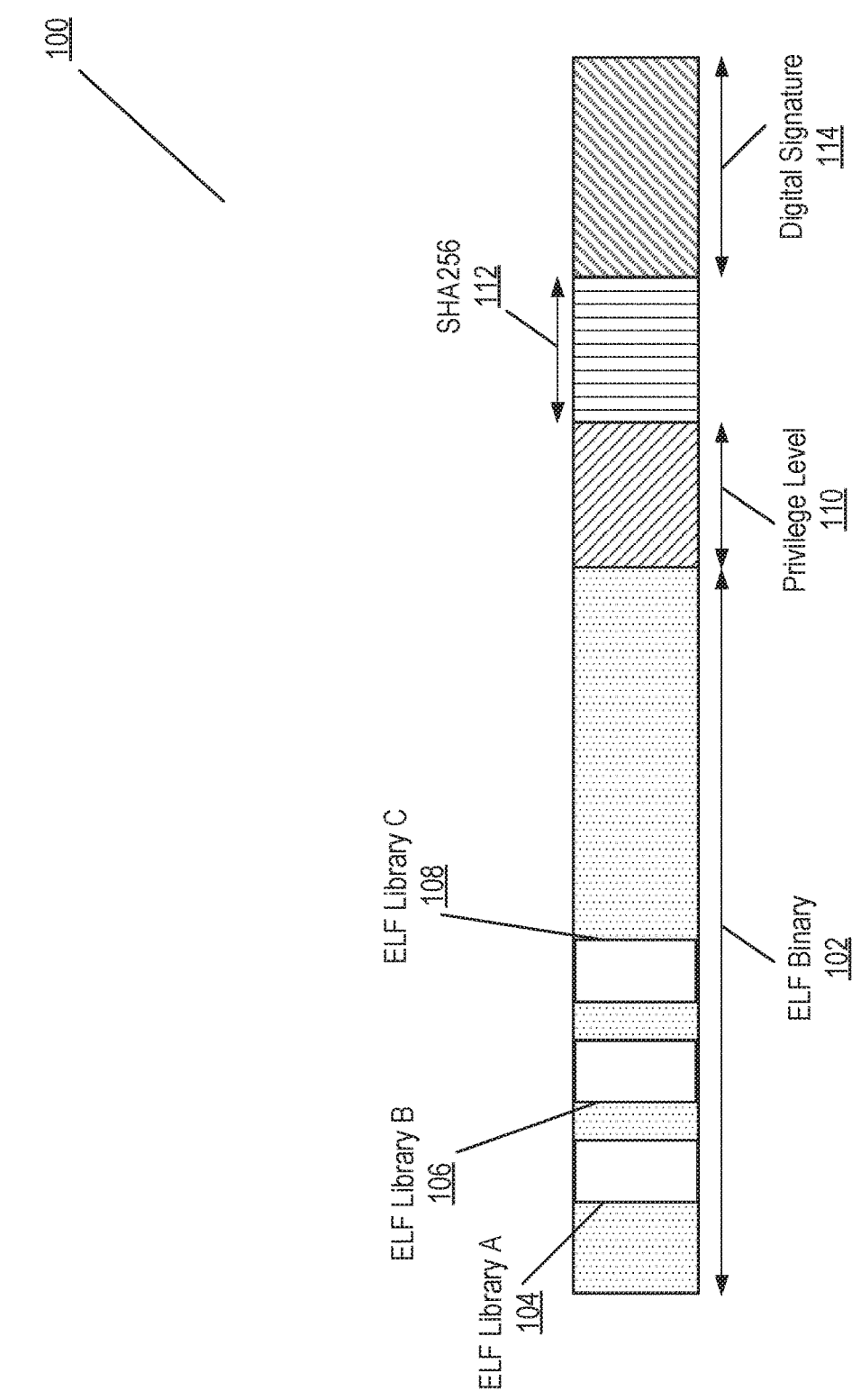
FIG. 1 illustrates an example embodiment of a binary signature created during build time in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure. Likewise, the disclosure is not limited to various embodiments given in this specification.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present technology can include a method for authorization of a first process by a privileged process is provided, where the privileged process receives an authorization request from the first process. The privileged process and the first process can execute in different namespaces. After receiving the authorization request from the first process by the privileged process, the privileged process freezes the first process and retrieves a stored hash. The stored hash is derived from code making up the first process that is stored in association with the code making up the first process. The privileged process applies a hash function to the code making up the first process from the pages loaded onto a random access memory (RAM) to calculate a calculated hash value. The method further includes determining whether a stored hash value stored in association with the code making up the first process matches the calculated hash value. If it is determined that the stored hash value matches the calculated hash value, the method further includes authorizing the first process by the privileged process and unfreezing the first process in association with the authorizing the first process.

The method further includes, after determining that the stored hash value matches the calculated hash value, and before the authorizing the first process, validating a digital signature stored in association with the code making up the first process.

According to some embodiments disclosed herein, the code making up the first process includes privilege levels appropriate for the first process and the authorizing the first processes includes authorizing the first process for privileges defined in the privilege levels. According to some embodiments, the privileged process and the first process are containerized processes.

The method further includes, after the authorizing the first process, recalculating a hash value by applying the hash function to the code making up the first process to yield a recalculated hash value. The method further includes determining whether the stored hash value stored in association with the code making up the first process matches the recalculated hash value. If it is determined that the stored hash value stored in association with the code making up the first process does not match the recalculated hash value, the method freezes or terminates the first process.

According to some embodiments disclosed herein, the privileged process and the first process are located on the same computing node. Further, the privileged process either accesses secure storage on a local node or accesses a secure server to retrieve a public key for validating the digital signature.

DETAILED DESCRIPTION

It is important to have mechanisms to verify that software to be installed or executed on a computing system is safe and authentic. One mechanism that is sometimes used is for a trusted source to sign the code of an application or process. The trusted source can either be the author of the code or an entity that tests and inspects code. Then, an entity desiring to run the code can verify the authenticity of a software by verifying that the digital signature associated with the software is the proper digital signature for the trusted source. However, there are at least two drawbacks associated with this verification approach. First, static content on the filesystem can be modified after the validation of the digital signature, which circumvents the digital signature approach. Second, library calls can be hijacked at runtime by updating a symbol resolution after the verification. According to the definition, symbol resolution includes assigning each symbol reference exactly one symbol definition. If library calls are hijacked at runtime by updating the symbol resolution after verification, then making verification using digital signature becomes an ineffectual approach.

A further method of determining that software is safe and authentic involves identifying some safe code blocks in the software with a hash value. Then, when software is to be executed a service, such as might be provided by an operating system, can validate the code blocks by computing a hash value and comparing it to a list of expected hash values. If a hash for a code block does not match with a predetermined value, the service realizes that integrity of the code block has been lost due to some malicious behaviors. After realizing that the integrity of the code block has been lost, the service aborts access of the code block to sensitive information. An example of this type of service is dm-verity provided by the LINUX operating system.

While such a code verification service has advantages over code signing, namely, that verifying the hash of the code before run time ensures that the code block has not been modified since the code was signed, the code verification service also has its own limitations. Since a code verification service is a kernel module that does checksum validation at the time of populating the pages into a cache (page fault), the code verification service does not validate the code again once a memory is populated. One-time validation of content gives bad actors and hackers an opportunity to modify the content after the one-time validation and the content was populated in the memory.

The present technology overcomes the problems noted above and offers additional benefits. Specifically, the present technology provides a mechanism for dynamically verifying the trustworthiness of the code during runtime so that the code cannot be hijacked or changed in memory.

Furthermore, the present technology also provides a mechanism by which permissions or access pertaining to the code and what data or service it can access can be determined without a connection to the Internet. Often, privilege determination or escalation is managed by a central service that is often not executing on the same node as the software.

In accordance with some aspects the subject technology, an unprivileged containerized process is authorized by a privileged containerized process. Authorization by the privileged containerized process is performed without embedding basic credentials or requiring network access at the time of validation.

The unprivileged process, herein called P1, runs in an isolated namespace. P1 needs to be authorized to perform sensitive operations, such as accessing or updating a device configuration or an encrypted storage.

The privileged process, herein called P2, runs in a separate namespace than that of P1. According to some embodiments, P2 can authorize P1 to perform sensitive operations. In fact, P2, being the privileged process, can act as a broker for P1. In some embodiments, P1 and P2 are containerized processes, or virtual machines, or applications in a sandboxed environment, etc.

In some embodiments, authorization of P1 is performed in two phases: a build time and an execution time. For example, a secure hash algorithm (e.g., SHA256) is used to generate a hash value is for a binary file and dependent libraries of the binary file. SHA256 is one of a number of cryptographic hash functions that generates a 256-bit value. The generation of the SHA256 hash value is based on parts of the binary file that remain static during the build time as well as during the execution time. Parts of the binary file that remain static during the build time and the execution time are text segment (.text) and read-only data segment (.rodata).

In some embodiments, if the authorization process knows expected values at the various locations within, other segments of the binary file may also be used in generating the SHA256 value. Other segments of the binary file that can be used in generating the SHA256 value are data segment (.data) and BSS (.bss) segment.

In the following, steps involved in a build time process in the build time and an authorization process of P1 conducted by P2 in the execution time are described.

The build time process performs in the build time. After a source is compiled into an executable and linkable format (ELF) binary and dependent libraries of the ELF binary, the build time process generates a single SHA256 of a text segment (.text) and a read-only data segment (.rodata) of the ELF binary. Further, the build time process generates a hash value for each of the dependent libraries of the ELF binary. The build time process ensures that generated hash values of the ELF binary and dependent libraries of the ELF binary are sorted alphabetically, in order to get a final hash value during both the build time and the execution time. The final hash value, which is generated in the build time uses the alphabetically sorted hash values of the ELF binary and dependent libraries of the ELF binary. In some embodiments, the build time process generates hash values for the ELF binary and for each of the dependent libraries of the ELF binary. Afterwards, the build time process generates the final hash value for the ELF binary, when the ELF binary includes its dependent libraries.

In some embodiments, a data segment and a BSS of the ELF binary and the dependent libraries can be appended to the text segment (.text) and the read-only data segment (.rodata). Appending the data segment and the BSS create a more inclusive hash value.

The build time process appends the generated hash value to the end of the ELF binary. After appending the hash value to the end of the ELF binary, the build time process creates a digital signature of the combination of the ELF binary and the hash value using asymmetric cryptography. The build time process then appends the created digital signature to the end of the hash value.

It is to be noted that when a list dynamic dependencies (LDD) command loads the ELF binary onto the main memory, the LDD command ignores both the appended hash value and the digital signature. Since both the hash value and the digital signature are outside boundaries of the ELF binary, they are ignored by the LDD command.

After completing the above-mentioned steps in the build time by the build time process, the authorization process conducts the following steps in the execution time. The privileged containerized process P2 is responsible to authorize the unprivileged containerized process P1. In some embodiments, P2 can run on the same node as P1. In some other embodiments, P2 can remotely execute from P1, but within the same local domain as P1. In some embodiments, P1 and P2 are in the same computer node.

In accordance with some aspects of the subject technology, P2 has access either to secure storage on a local node or a secure server to retrieve a public key for verifying the digital signature. The digital signature has been created during the build time. Afterwards, P1 connects to P2 via Unix domain socket (UDS) and requests to be validated by P2.

After receiving the validation request from P1, P2 obtains a process identifier (PID) of P1 by looking up UCRED structure of the peer. To continue the authorization process, P2 conducts the following steps.

P2 freezes P1 and all associated processes running under P1. P2 does the freezing using control groups (cgroups) functionality. Then, P2 identifies various libraries and their locations from the output of "/proc/<P1_PID>/maps".

P2 then generates a new hash value by accessing a runtime memory content from "/proc/<P1_PID>/mem 1". The new hash value that is generated includes the the text segment (.text) and the read-only memory data segment (.rodata) of the ELF binary and the dependent libraries of the ELF binary. Similar to what was described with respect to the build time, the new hash value that is generated in the execution time uses the sorted hash values of the ELF binary and dependent libraries of the ELF binary.

In a later step, P2 verifies if the new hash value from the runtime memory is the same as the hash value generated during the build time. If P2 determines that the hash value generated during the build time and the new hash value generated during the execution time match, then P2 verifies the validity of the digital signature created during the build time. If P2 determines that the hash value generated during the build time and the new hash value generated during the execution time do not match, then P2 aborts the authorization process and simply does not authorize P1.

After successful verification of the digital signature by P2, P2 authorizes P1. Further, P2 unfreezes P1 and all the processes associated with P1.

There are numerous advantages associated with the authorization process described above. P1 is authorized by P2 without embedding credentials or requiring network access at the time of validation. Further, any modifications to the text segment of the ELF binary or of the dependent libraries of the ELF binary will be caught by a difference in hash values generated during the build time and the execution time. Even if the hash value generated during the build time is updated in order to match the new hash value generated during the execution time, it will be thwarted by the digital signature validation.

Another advantage associated with the authorization process is since P1 runs within an isolated namespace, P1 is not able to subvert the validation process performed by P2. Furthermore, the authorization process proposed herein is ideally suited for public cloud deployment of a containerized virtual network functions (VNF).

In some embodiments, the authorization process proposed herein can be extended to monitor P1 periodically. By periodically monitoring P1, P2 ensures that P1 has maintained its authenticity while having access to secret information/privileges. If, for any possible reason, P1 loses its authenticity while having access to secret information/privileges, P2 can abrogate authorization given to P1.

In accordance with some aspects of the subject technology, a privilege level can be appended to the ELF binary. Having the privilege level appended to the ELF binary gives P2 more granular access control over P1. When there is no privilege level associated with P1, P1 and all its associated processes can access all secrets and privileges after P1 is authorized by P2. However, when there is the privilege level associated with P1, the privilege level plays a role in authorizing P1 by P2.

FIG. 1 illustrates an example of a binary signature 100 created during build time, in accordance with some aspects of the subject technology.

As illustrated in FIG. 1, ELF binary 102 denotes an executable and linkable format (ELF) binary. ELF binary 102 may have several dependent libraries. As an example, FIG. 1 illustrates three executable and linkable format (ELF) libraries, library A 104, ELF library B 106, and ELF library C 106, utilized by ELF binary 102. In some embodiments, ELF binary 102 libraries are outputs of a compiler. ELF binary 102 can include a header (not shown in FIG. 1), in which a dependency list of dependent libraries are stored.

In accordance with some aspects of the subject technology, the binary 100 can be associated with one or more privilege levels. In FIG. 1, privilege level 110 represents a listing of one or more privilege levels, associated with a first process. The format and value of privilege level 110 are based upon a pre-determined format and a pre-determined value. In some embodiments, privilege level 110 allows a second process to authorize the first process according to the privileges listed in privilege level 110 segment of binary code 100.

Having privilege level 110 included in binary code 100 provides several advantages. For example, having multiple privileged levels in binary 100 gives the second process granular access control over the first process. When there is only one privilege level associated with the first process, the first process and all its associated processes can only be authorized for its maximum allowed privileged level once authorized by the second process. However, when there are multiple privilege levels associated with the first process, the second process can provide more limited access through a lower privilege level when that is all that is needed, and the second process can escalate the privilege level of the first process when greater access is needed. Privilege level 110 is appended to the end of ELF binary 102.

Another advantage to having privilege level 110 included in the binary code 100 is that the second process does not need to access another service to learn what privilege level is appropriate for the first process. As long as the second process can determine that the first process is from a safe source, and that it has not been tampered with since being verified by the safe source, the second process can accept the privilege levels 110 as being authentic and trust worthy as well.

In some embodiments, SHA256 hash 112 is a hash value calculated using ELF binary 102 (including its libraries 104, 106, and 108) plus privilege level 110 as its input. After calculating hash value 112, it is appended to the end of privilege level 110 segment of the binary code 100.

In some embodiments, there are two main sections of ELF binary 102 and dependent libraries of ELF binary 102 that remain static during a build time as well as during an execution time. These two main sections are text segment (.text) and read-only data segment (.rodata). SHA256 112 is generated, at least in part, based upon .text and .rodata segments of ELF binary 102 and dependent libraries of ELF binary 102.

Digital signature 114 represents a digital signature of ELF binary 102, privilege level 110, and hash value 112. In some embodiments, digital signature 114 is created using asymmetric cryptography. After the creation of digital signature 114, digital signature 114 is appended to the end of hash value 112.

Figure 2:
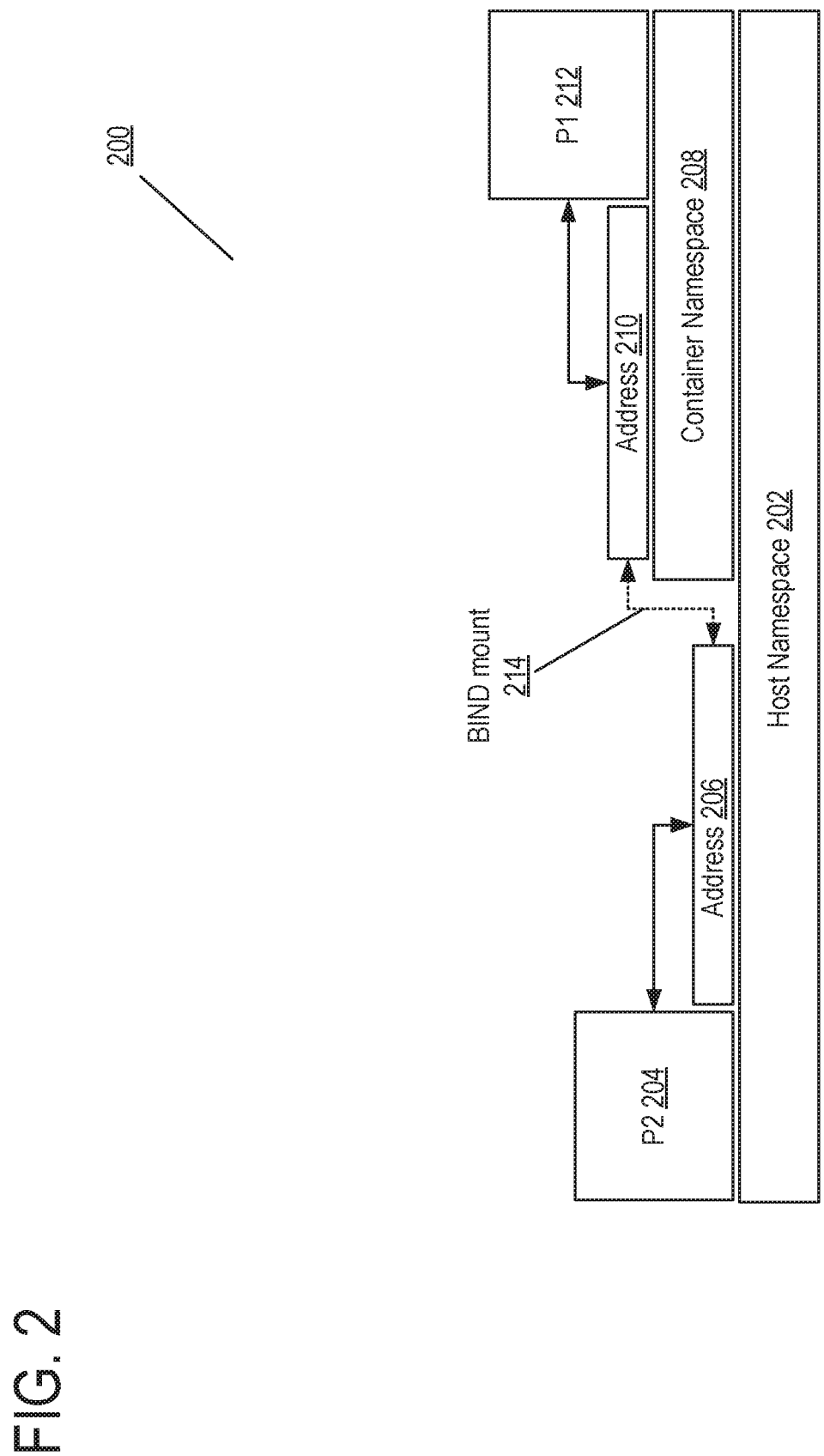
FIG. 2 illustrates an example embodiment of a communication between two processes in accordance with some aspects of the present technology.

FIG. 2 illustrates an example communication 200 between two processes, in accordance with some aspects of the subject technology. In some embodiments, P2 204 with associated address 206 represents a privileged process. In some embodiments, P1 212 with associated address 210 represents an unprivileged process that needs to be authorized by P2 204 to access some sensitive information or perform some sensitive operations. P1 212 and its associated address 210 are within container namespace 208. In FIG. 2, P1 212 and P2 204 have host namespace 202 in common. In some embodiments, P1 212 and P2 204 run on the same machine. P1 212 and P2 204 communicate via intra namespace communication which does not require communication over the Internet.

In some embodiments, a filesystem is mounted in P2 204. Bind mount 214 provides P2 204 with the possibility of mounting all, or even part of the filesystem to P1 212 Thus, the filesystem becomes accessible from both P2 204 and P1 212 simultaneously.

Figure 3:
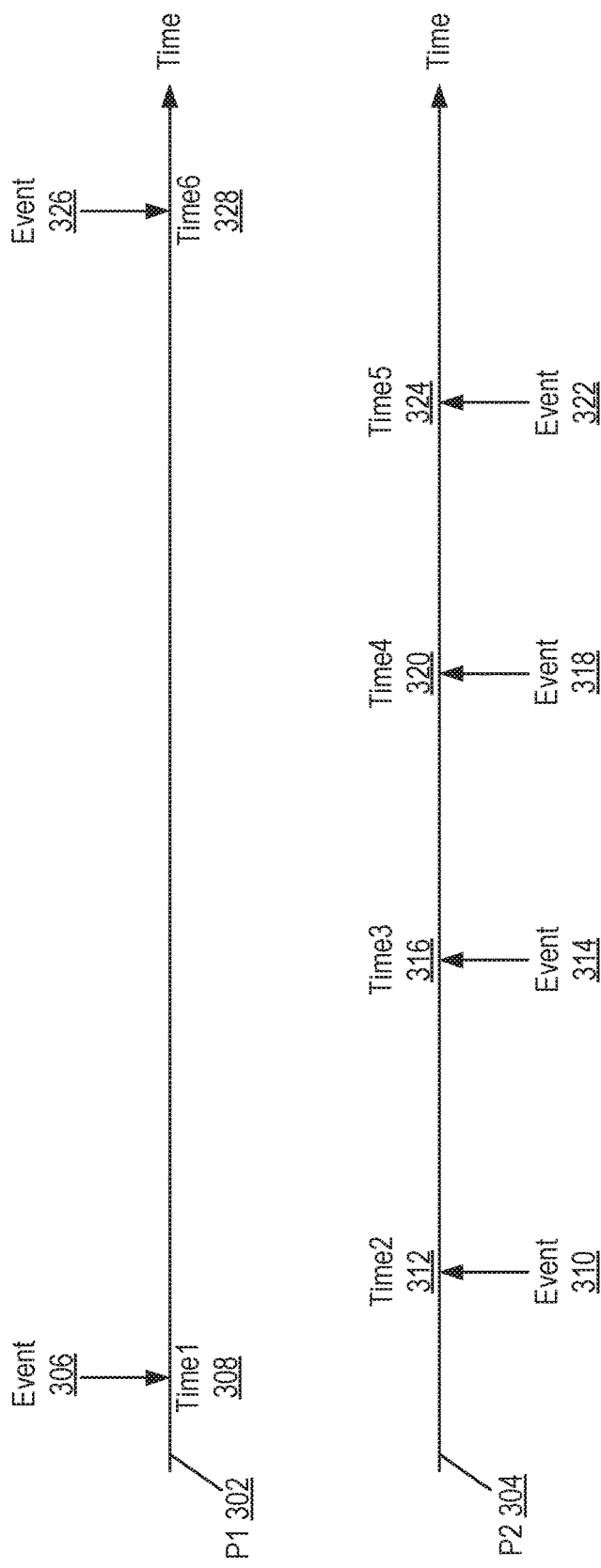
FIG. 3 illustrates an example embodiment of a message sequence exchanged between two processes in accordance with some aspects of the present technology.

FIG. 3 illustrates an example message sequence 300 between two processes, in accordance with some aspects of the subject technology. The sequence and the order of messages in the sequence outlined herein are non-limiting examples provided for illustration purposes, and can be implemented in any combination thereof, including combinations that exclude, add, or modify certain steps without deviating from the main scope of the subject technology.

In FIG. 3, P1 302 represents an unprivileged process that needs to be authorized to perform sensitive operations, such as accessing or updating device configuration or accessing encrypted storage. P1 302 initiates message sequence 300 at event 306. Event 306 happens at timestamp time1. At event 306, P1 302 sends an authorization request to P2 304 via a Unix domain socket (UDS). The Unix domain socket (UDS) is a data communications endpoint for exchanging data between processes executing on the same host namespace.

In FIG. 3, P2 304 represents a privileged process that can authorize P1 302 to perform sensitive operations. P2 304 receives the authorization request sent by P1 302. At timestamp time2, event 310 happens. Timestamp time2 is greater than timestamp time1. At event 310, P2 304 obtains the peer product ID (PID) from P1 302, freezes control groups (cgroups) associated with P1 302, and calculates a hash value from the executable and linkable format (ELF) binary and dependent libraries of the ELF binary of P1 302. In some embodiments, the ELF binary and the dependent libraries of the ELF binary may include an embedded privilege level required by a connecting process.

Event 314 happens at timestamp time3. Timestamp time3 is greater than timestamp time2. At event 314, P2 304 determines whether the calculated hash value matches with a retrieved hash value from the ELF binary. At event 310, if P2 304 determines that the calculated hash value matches with the retrieved hash value from the ELF binary, P2 304 proceeds to validate a digital signature appended to the ELF binary. Further, at event 310, if P2 304 determines that the calculated SHA256 does not match with the retrieved SHA256 from the ELF binary, P2 304 aborts message sequence 300 and terminates P1 302.

Event 318 happens at timestamp time4. Timestamp time4 is greater than timestamp time3. Event 318 happens if P2 304 successfully validates the digital signature appended to the ELF binary. At event 318, P2 304 can release secret credentials or access to devices and allow other actions, by interacting with a host operating system. According to some embodiments, P2 304 can use the embedded privilege level to selectively provide required permission.

Event 322 happens at timestamp time5. Timestamp time5 is greater than timestamp time4. At event 322, P2 304 unfreezes control groups (cgroups) and allows P1 302 to continue execution.

Event 326 happens at timestamp time6. Timestamp time6 is greater than timestamp time5. At event 326, P1 302 concludes message sequence 300 by succeeding in getting access to sensitive information.

Figure 4:
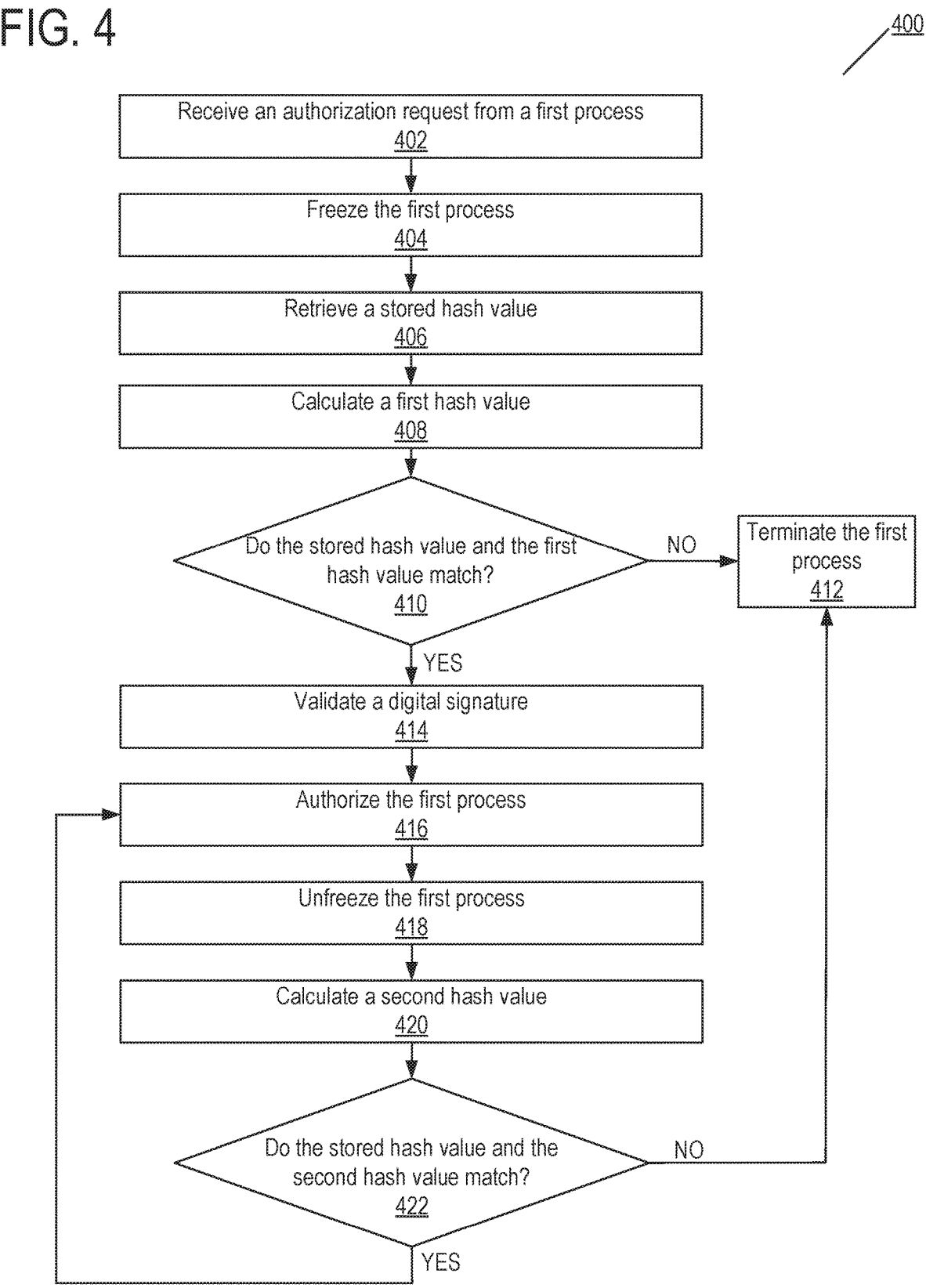
FIG. 4 illustrates an example method embodiment for authorization of a containerized process, in accordance with some aspects of the present technology.

FIG. 4 illustrates an example method embodiment for authorization of a process, in accordance with some aspects of the subject technology. Steps and processes outlined herein are non-limiting examples provided for illustration purposes, and can be implemented in any combination thereof, including combinations that exclude, add, or modify certain steps. In some aspects, method 400 and its associated steps and processes may be performed by a computing system or at least one process executing on the computing system. The computing system can be a desktop computer, a laptop, a tablet, a mobile computing device, or generally any computing system, having at least one processor, capable of performing method 400.

At operation 402, a privileged process (for example, P2 addressed in FIG. 2 and FIG. 3 above) receives an authorization request from a first process. After receiving the authorization request, the privileged process freezes (404) the first process. Freezing (404) the first process may also include freezing all processes associated with or dependent on the first process.

After freezing the first process in operation 404, the privileged process retrieves (406) a stored hash value. In some embodiments, the stored hash value is a fixed value, generated based on an executable and linkable format (ELF) binary and dependent libraries of the ELF binary of the first process.

In accordance with some embodiments of the subject technology, the privileged process can use a secure hash algorithm 256-bit (SHA256) to generate the first hash value.

At operation 410, the privileged process determines whether the stored hash value and the first hash value match. If the stored hash value and the first hash value do not match, the privileged process terminates (412) the first process.

If the stored hash value and the first hash value do match, the privileged process validates (414) a digital signature. In accordance with some aspects of the subject technology, the digital signature is created using asymmetric cryptography.

After validating the digital signature at operation 414, the privileged process authorizes (414) the first process and unfreezes (418) the first process. In accordance with some aspects of the subject technology, after operation 418, the first process is authorized by the privileged process to perform sensitive operations, such as accessing or updating device configuration or encrypted storage.

In accordance with some aspects of the subject technology, the privileged process can continuously (dynamically) validate the authenticity of the first process by performing the operations of method 400 in a predetermined periodicity to ensure the first process has maintained its authenticity and has not been tampered with or otherwise changed while having access to sensitive information or performing sensitive operations. The first process can lose its authenticity due to a number of reasons. In some embodiments, the first process can lose its authenticity because a hacker has tampered with the first process at some point after the first process has been authorized. To minimize the possibility of tampering with the first process after the first process has been authorized, method the privileged process calculates a second hash value and then continues to operation 422. In some embodiments, the privileged process can use a secure hash algorithm 256-bit (SHA256) to generate the second hash value.

At operation 422, the privileged process determines whether the stored hash value and the second hash value match. If the stored hash value and the second hash value do not match, it means that the first process has lost its authenticity while having access to sensitive information. If the stored hash value and the second hash value do not match, the privileged process terminates (412) the first process.

If the stored hash value and the second hash value do match, it means that the first process has maintained its authenticity while having access to sensitive information. If the stored hash value and the second hash value do match, the privileged process authorizes (416) the first process.

Figure 5:
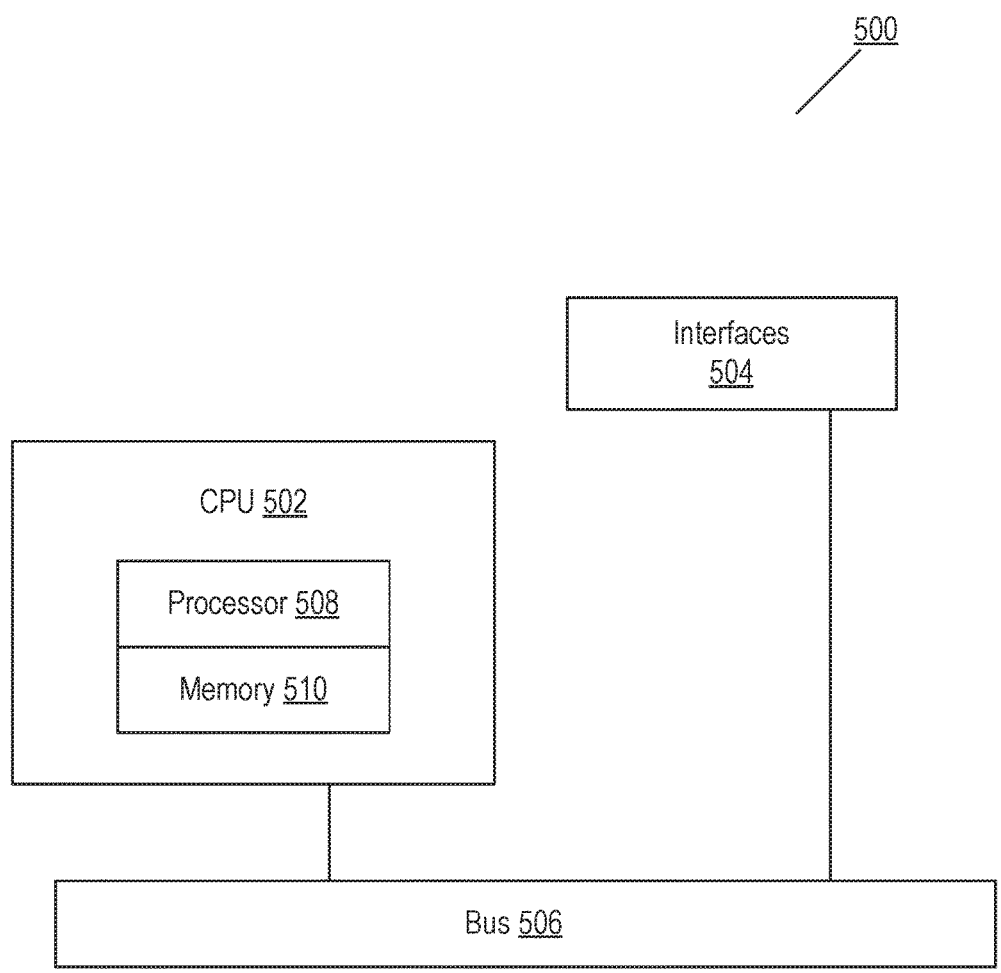
FIG. 5 illustrates an example of a networking device in accordance with some aspects of the present technology.

FIG. 5 illustrates an example network device 500 (e.g., switch, router, network appliance, etc.). Network device 500 can include a master central processing unit (CPU) 502, interfaces 504, and a bus 506 (e.g., a PCI bus). When acting under the control of appropriate software or firmware, CPU 502 can be responsible for executing packet management, error detection, and/or routing functions. CPU 502 preferably accomplishes all these functions under the control of software including an operating system and any appropriate applications software. CPU 502 may include one or more processors 508 such as a processor from the Motorola family of microprocessors or the MIPS family of microprocessors. In an alternative embodiment, processor 508 can be specially designed hardware for controlling the operations of network device 500. In an embodiment, a memory 510 (such as non-volatile RAM and/or ROM) can also form part of CPU 502. However, there are many different ways in which memory could be coupled to the system.

Interfaces 504 can be provided as interface cards (sometimes referred to as line cards). Generally, they control the sending and receiving of data packets over the network and sometimes support other peripherals used with network device 500. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 504 may include ports appropriate for communication with the appropriate media. In some cases, interfaces 504 may also include an independent processor and, in some instances, volatile RAM. The independent processors may control communication intensive tasks such as packet switching, media control, and management. By providing separate processors for the communication intensive tasks, interfaces 504 may allow CPU 502 to efficiently perform routing computations, network diagnostics, security functions, and so forth.

Although the system shown in FIG. 5 is one specific network device of the present disclosure, it is by no means the only network device architecture on which the subject technology can be implemented. For example, an architecture having a single processor that can handle communications as well as routing computations and other network functions can also be used. Further, other types of interfaces and media may also be used with network device 500.

Regardless of the network device's configuration, it may employ one or more memories or memory modules (including memory 510) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Network device 500 can also include an application-specific integrated circuit (ASIC), which can be configured to perform routing and/or switching operations. The ASIC can communicate with other components in network device 500 via bus 510, to exchange data and signals and coordinate various types of operations by network device 500, such as routing, switching, and/or data storage operations, for example.

Figure 6:
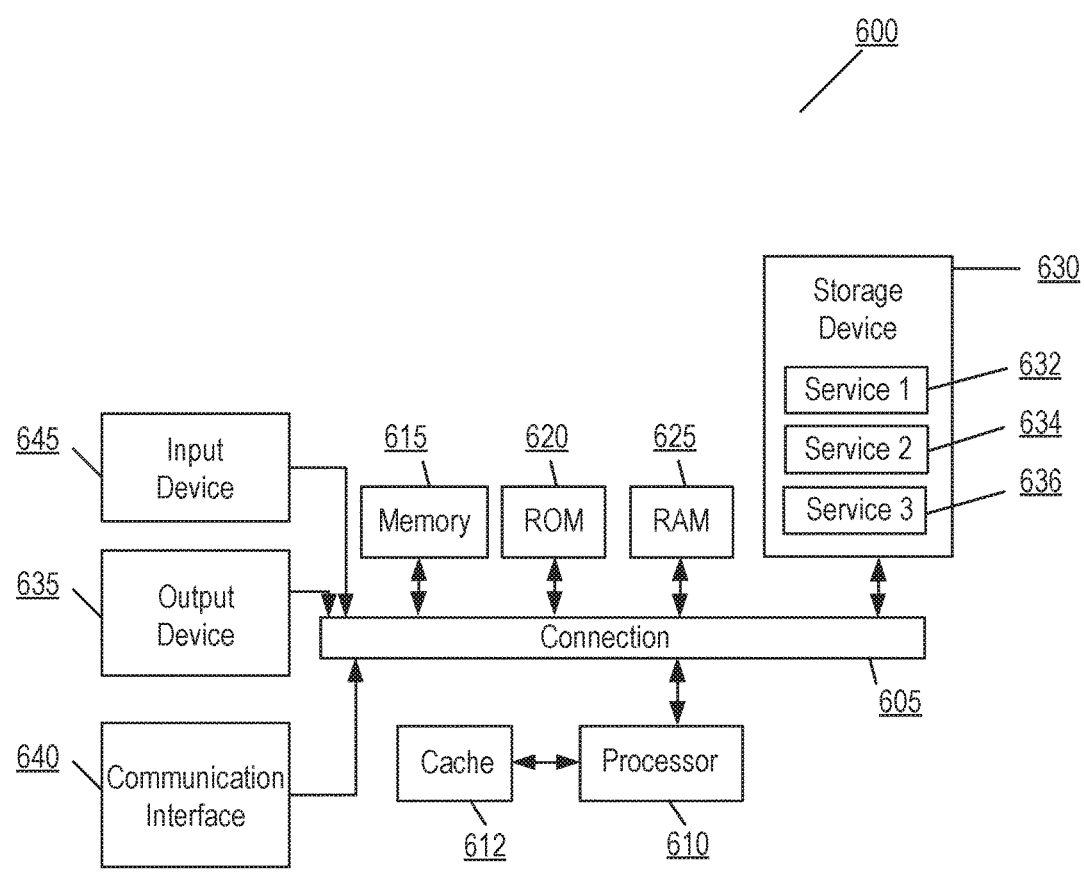
FIG. 6 illustrates an example of a computing system in accordance with some aspects of the present technology.

FIG. 6 shows an example of computing system architecture 600, which can be for example any computing device, such as a computing device executing the privileged process or unprivileged process described herein or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or a software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

Storage device 630 can include software services, servers, services, etc., that when the code that defines such software is executed by processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a privileged process, an authorization request from a first process;
retrieving, by the privileged process, a stored hash value derived from code making up the first process that is stored in association with the code making up the first process;
determining whether the stored hash value stored in association with the code making up the first process matches a calculated hash value that is calculated by the privileged process by applying a hash function to the code making up the first process;
validating a digital signature stored in association with the code making up the first process; and
when it is determined that the stored hash value matches the calculated hash value, authorizing, by the privileged process, the first process,
wherein the privileged process either accesses secure storage on a local node or accesses a secure server to retrieve a public key for validating the digital signature.

2. The method of claim 1, further comprising:
after receiving the authorization request from the first process, freezing the first process, by the privileged process; and
unfreezing the first process in association with the authorizing the first process.

3. The method of claim 1, wherein the code making up the first process includes privilege levels appropriate for the first process; and the authorizing the first processes includes authorizing the first process for privileges defined in the privilege levels.

4. The method of claim 1, wherein the first process and the privileged process are containerized processes.

5. The method of claim 1, further comprising:
after the authorizing the first process, recalculating a hash value by applying the hash function to the code making up the first process to yield a recalculated hash value; and
determining whether the stored hash value stored in association with the code making up the first process matches the recalculated hash value.

6. The method of claim 5, further comprising:
when it is determined that the stored hash value stored in association with the code making up the first process does not match the recalculated hash value, freezing or terminating the first process.

7. The method of claim 1, wherein the privileged process and the first process are located on the same computing node.

8. A non-transitory computer readable medium comprising instructions, the instructions effective to cause at least one processor to:
receive, by a privileged process, an authorization request from a first process;
retrieve, by the privileged process, a stored hash value derived from code making up the first process that is stored in association with the code making up the first process;
determine whether the stored hash value stored in association with the code making up the first process matches a calculated hash value that is calculated by the privileged process by applying a hash function to the code making up the first process;
validate a digital signature stored in association with the code making up the first process; and
when it is determined that the stored hash value matches the calculated hash value, authorize, by the privileged process, the first process,
wherein the privileged process either accesses secure storage on a local node or accesses a secure server to retrieve a public key for validating the digital signature.

9. The non-transitory computer readable medium of claim 8, comprising further instructions, the further instructions effective to cause the at least once processor to:
after receiving the authorization request from the first process, freeze the first process, by the privileged process; and
unfreeze the first process in association with the authorizing the first process.

10. The non-transitory computer readable medium of claim 8, wherein the code making up the first process includes privilege levels appropriate for the first process and the authorizing the first processes includes authorizing the first process for privileges defined in the privilege levels.

11. The non-transitory computer readable medium of claim 8, comprising further instructions, the further instructions effective to cause the at least once processor to:
after the authorizing the first process, recalculate a hash value by applying the hash function to the code making up the first process to yield a recalculated hash value; and
determine whether the stored hash value stored in association with the code making up the first process matches the recalculated hash value.

12. The non-transitory computer readable medium of claim 11, comprising further instructions, the further instructions effective to cause the at least once processor to:
when it is determined that the stored hash value stored in association with the code making up the first process does not match the recalculated hash value, freeze or terminate the first process.

13. A system comprising:
at least one non-transitory computer readable medium storing instructions thereon; and
at least one processor to execute the instructions to cause the system to:
receive, by a privileged process, an authorization request from a first process;
retrieve, by the privileged process, a stored hash value derived from code making up the first process that is stored in association with the code making up the first process;
determine whether the stored hash value stored in association with the code making up the first process matches a calculated hash value that is calculated by the privileged process by applying a hash function to the code making up the first process;
validate a digital signature stored in association with the code making up the first process; and
when it is determined that the stored hash value matches the calculated hash value, authorize, by the privileged process, the first process,
wherein the privileged process either accesses secure storage on a local node or accesses a secure server to retrieve a public key for validating the digital signature.

14. The system of claim 13, wherein the instructions are further effective to cause the system to:

after receiving the authorization request from the first process, freeze the first process, by the privileged process; and unfreeze the first process in association with the authorizing the first process.

15. The system of claim 13, wherein the instructions are further effective to cause the system to:

after the authorizing the first process, recalculate a hash value by applying the hash function to the code making up the first process to yield a recalculated hash value; and determine whether the stored hash value stored in association with the code making up the first process matches the recalculated hash value.

* * * * *